United States Patent
Cannon, III et al.

(10) Patent No.: US 9,602,358 B2
(45) Date of Patent: Mar. 21, 2017

(54) EXTENSIBLE INFRASTRUCTURE FOR REPRESENTING NETWORKS INCLUDING VIRTUAL MACHINES

(75) Inventors: Thomas C. Cannon, III, San Jose, CA (US); Stephanie Dee, Cupertino, CA (US); Peter J. Shepherd, San Jose, CA (US); Robert Lee Thompson, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 939 days.

(21) Appl. No.: 13/218,121

(22) Filed: Aug. 25, 2011

(65) Prior Publication Data
US 2013/0055244 A1  Feb. 28, 2013

(51) Int. Cl.
| | |
|---|---|
| G06F 9/455 | (2006.01) |
| H04L 12/24 | (2006.01) |
| G06F 11/30 | (2006.01) |
| G06F 11/32 | (2006.01) |
| G06F 3/0483 | (2013.01) |
| G06F 3/0484 | (2013.01) |

(52) U.S. Cl.
CPC ........... *H04L 41/22* (2013.01); *G06F 3/0483* (2013.01); *G06F 3/04842* (2013.01); *G06F 11/3006* (2013.01); *G06F 11/3051* (2013.01); *G06F 11/32* (2013.01)

(58) Field of Classification Search
None
See application file for complete search history.

(56) References Cited

U.S. PATENT DOCUMENTS

| | | | |
|---|---|---|---|
| 7,315,985 B1* | 1/2008 | Gauvin et al. | 715/734 |
| 7,457,860 B2 | 11/2008 | Shang et al. | |
| 8,452,876 B1 | 5/2013 | Williams et al. | |
| 8,667,487 B1 | 3/2014 | Boodman et al. | |
| 8,799,362 B2 | 8/2014 | Lauwers et al. | |
| 2006/0026509 A1* | 2/2006 | Porter | 715/520 |
| 2006/0181531 A1 | 8/2006 | Goldschmidt | |
| 2006/0200494 A1 | 9/2006 | Sparks | |
| 2007/0014278 A1 | 1/2007 | Ebbesen et al. | |
| 2007/0113185 A1 | 5/2007 | MacLeod et al. | |
| 2008/0240119 A1 | 10/2008 | Wylie et al. | |
| 2010/0031198 A1* | 2/2010 | Zimmerman et al. | 715/853 |
| 2011/0113377 A1 | 5/2011 | Lategan | |
| 2011/0295841 A1* | 12/2011 | Sityon et al. | 707/722 |
| 2012/0151198 A1* | 6/2012 | Gupta | G06F 9/45558 713/2 |
| 2012/0317491 A1 | 12/2012 | Wong et al. | |
| 2012/0331064 A1* | 12/2012 | Deeter et al. | 709/206 |

OTHER PUBLICATIONS

Office Action dtd Feb. 26, 2016 for U.S. Appl. No. 13/218,126.
Office Action dtd Mar. 15, 2016 for U.S. Appl. No. 14/297,953.
Office Action dated Oct. 13, 2016 for U.S. Appl. No. 14/297,953.
Office Action dated Sep. 21, 2016 for U.S. Appl. No. 13/218,126.

\* cited by examiner

*Primary Examiner* — Kenneth Tang

(57) ABSTRACT

Embodiments provide a virtual machine infrastructure including an application model and a user interface for displaying data associated with a plurality of nodes. The user interface is arranged in a hierarchy of views. An application is added to the infrastructure by adding an edge category and a view extension to the infrastructure. The user interface simultaneously displays the added view extension together with a view extension provided by another application.

21 Claims, 16 Drawing Sheets

EXTENSIBLE INFRASTRUCTURE FOR REPRESENTING NETWORKS INCLUDING VIRTUAL MACHINES

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

At least some host computing devices are connected together to form one or more networks. In addition, at least some known cloud computing and/or datacenter environments include large numbers of host computing devices, and each computing device may include a plurality of VMs. Cloud computing and/or datacenter environments also include a plurality of network switches, datastores, and other devices or systems that support the host computing devices and VMs.

To ensure that the computing devices and/or other devices within a cloud computing environment and/or a datacenter operate efficiently and/or are configured properly, software management tools are often used. Such software management tools often display the computing devices and/or other devices in a tree or graphical view for monitoring. However, with large numbers of computing devices present in a cloud computing and/or datacenter environment, a tree view may become inconvenient, requiring a user to horizontally and/or vertically scroll through large sections of the tree within a relatively small application window. In addition, large numbers of computing devices and/or other devices may cause a graphical view to be visually convoluted and/or may require excessive computing resources to display the devices.

In addition, at least some known software management tools display data associated with computing devices in a segregated manner. In other words, the data is displayed only from the context of the application currently being accessed by the user. If the user wants to access other data available for a computing device that is supplied by another application, the user must exit the first application and access the second application, or must otherwise manually switch between applications. Accordingly, users may experience difficulty in identifying and/or diagnosing issues associated with computing devices.

SUMMARY

One or more embodiments described herein provide an extensible infrastructure for representing a network system including an application model and a user interface for displaying data associated with a plurality of nodes. The user interface is arranged in a hierarchy of views. An application is added to the infrastructure by adding an edge category and a view extension to the infrastructure. The user interface simultaneously displays the added view extension together with a view extension provided by another application.

This summary introduces a selection of concepts that are described in more detail below. This summary is not intended to identify essential features, nor to limit in any way the scope of the claimed subject matter.

DETAILED DESCRIPTION

Embodiments described herein provide an extensible infrastructure for representing a network system including a plurality of system objects such as computing devices and/or virtual machines (VMs). The infrastructure includes, in some embodiments, an application model, an object model, a resource model, and a user interface. In other embodiments, the infrastructure may include additional or fewer elements. The application model defines a hierarchical set of views to enable an application to navigate from an application entry point to a node representing a system object. The data model provides a set of views for representing data associated with nodes. In addition, the data model enables data associated with a node to be received from a first application being accessed, and receive data associated with the node from a second application without switching a focus from the first application or the node.

Accordingly, when an application views or displays data associated with a node, the application does not need to duplicate data from other applications for the node. Instead, the infrastructure enables a user to access the singular version of the node as it is shared between applications. In addition, administrators or users may access all data gathered for a node from a plurality of applications without having to switch between applications. The infrastructure and user interface are extensible, allowing an administrator or developer to add further extensions and interfaces to extend the functionality of the infrastructure and user interface in a customized manner.

Figure 1:
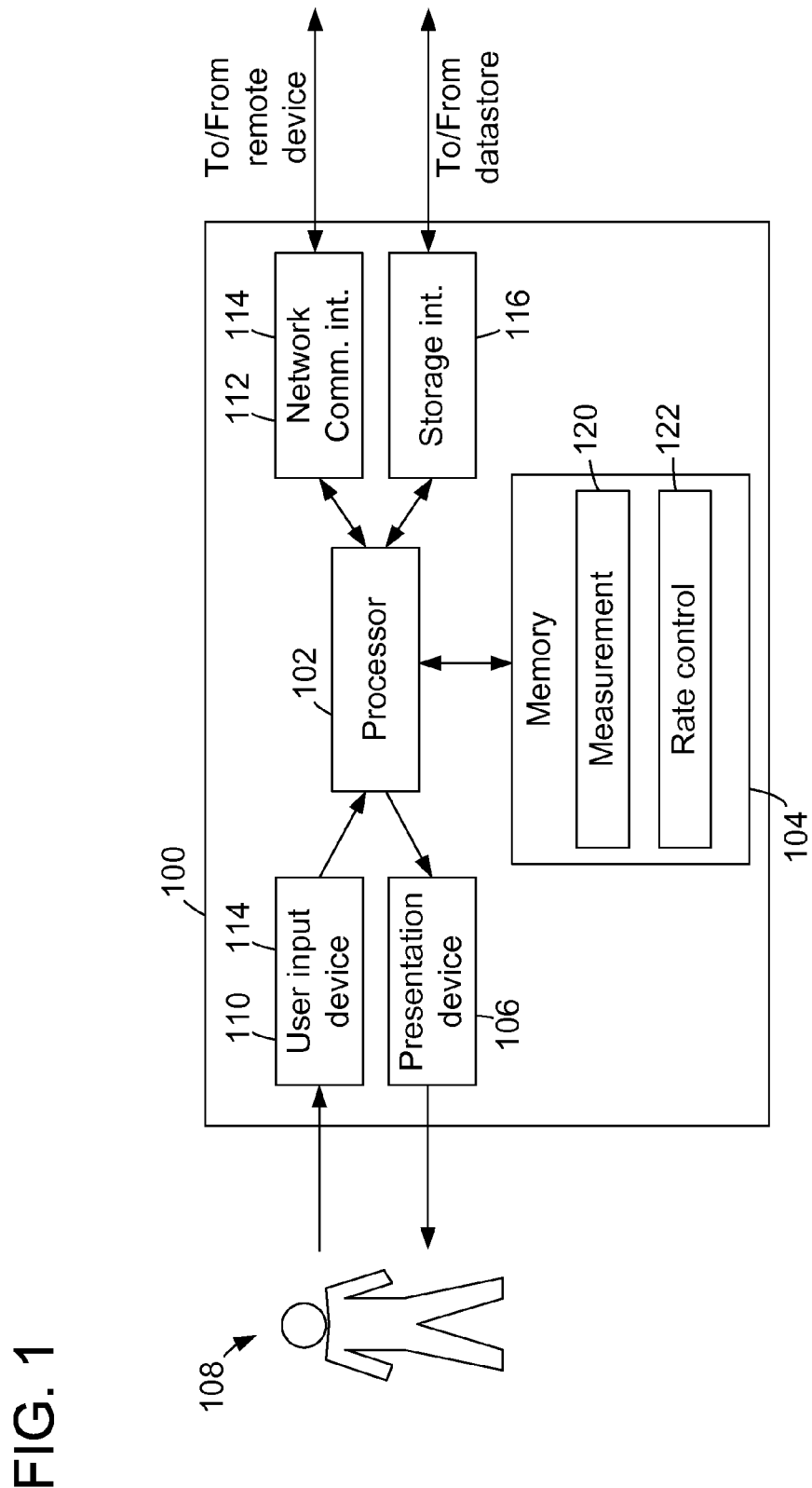
FIG. 1 is a block diagram of an exemplary computing device.

FIG. 1 is a block diagram of an exemplary computing device 100. Computing device 100 includes a processor 102 for executing instructions. In some embodiments, computer-executable instructions are stored in a memory 104 for performing one or more of the operations described herein. Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values), from a user.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
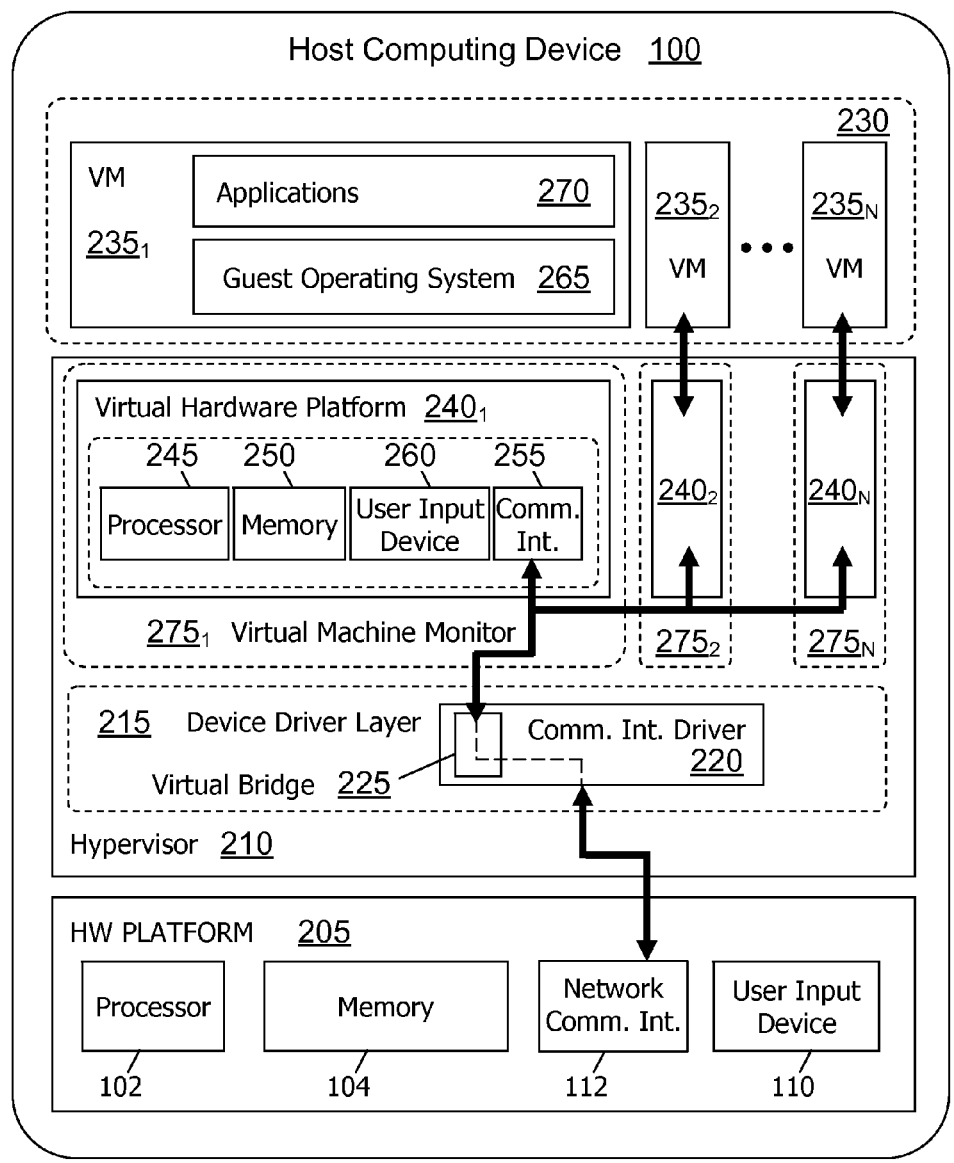
FIG. 2 is a block diagram of virtual machines that are instantiated on a computing device, such as the computing device shown in FIG. 1.

FIG. 2 depicts a block diagram of virtual machines $235_1$, $235_2 \ldots 235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$). Each virtual hardware platform includes its own emulated hardware (such as a processor 245, a memory 250, a network communication interface 255, a user input device 260 and other emulated I/O devices in VM $235_1$.

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
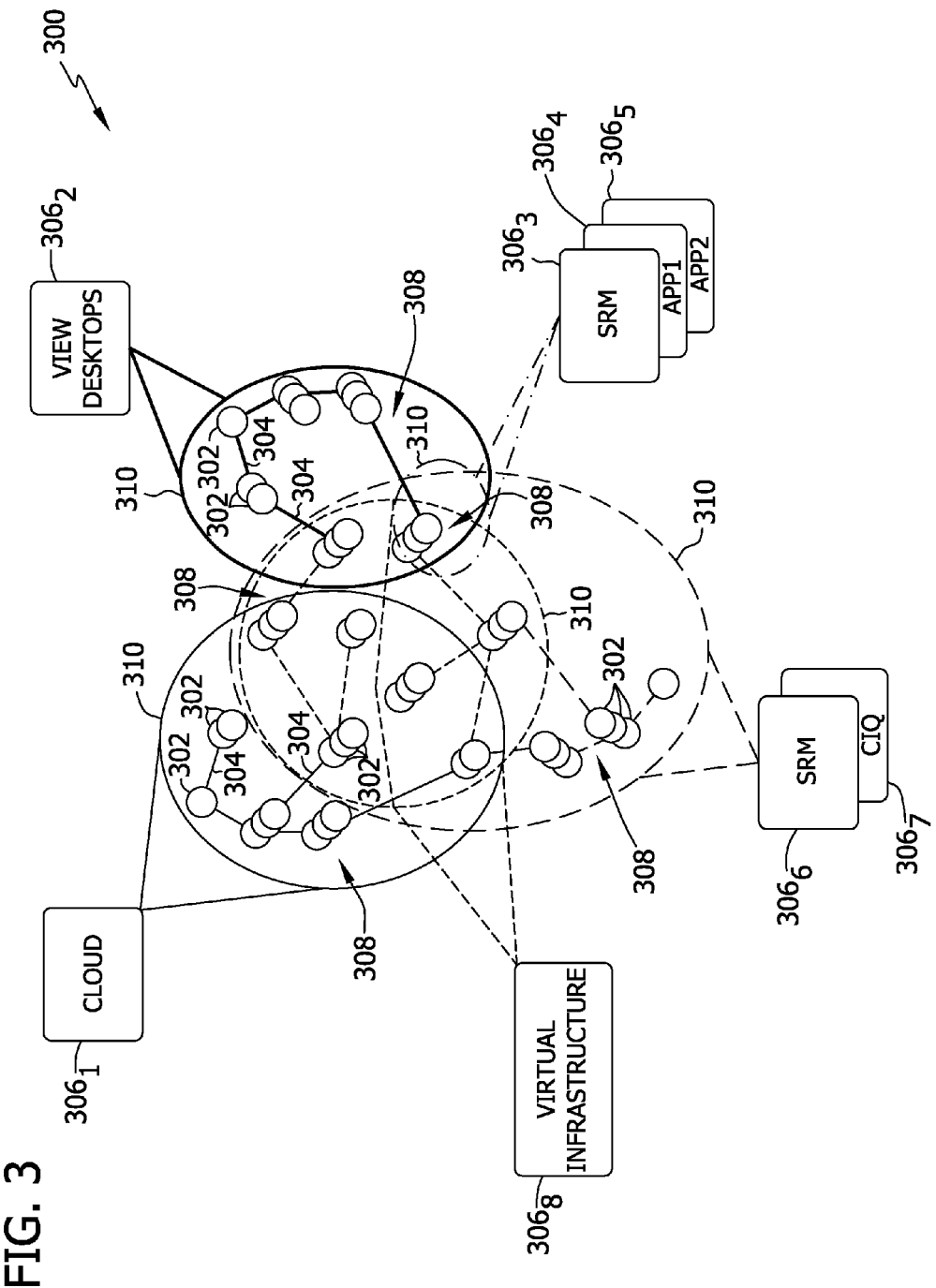
FIG. 3 is a graphical view of an exemplary extensible network system that includes a plurality of host computing devices shown in FIG. 1.

FIG. 3 is a graphical view of an exemplary extensible network system 300 that includes a plurality of host computing devices 100 (shown in FIG. 1) and/or VMs $235_1$-$235_N$ (shown in FIG. 2) that are communicatively coupled together. In an embodiment, network system 300 represents a virtual and/or physical datacenter executing on one or more computing devices 100 and/or VMs $235_1$-$235_N$.

In an embodiment, system 300 includes a plurality of nodes 302 that are each representative of at least one system object. The system objects may include one or more computing devices 100, VMs $235_1$-$235_N$, network switches (not shown), datastores (not shown), and/or any other resource or device. Nodes 302 may be grouped by, or included within, one or more node types (not shown) and are related to each other by one or more edges 304. In addition, as described more fully herein, nodes 302 and node types are extensible such that an application may add new nodes 302 and/or node types to system 300 and/or nodes 302.

Each edge 304 represents a relationship or common characteristic of a pair of nodes 302. Edges 304 may include, without limitation, a parent-child relationship, a physical relationship (e.g., two VMs $235_1$-$235_N$ may be instantiated within the same host computing device 100 and/or two computing devices 100 may be physically connected together), a common problem or error that each node 302 is experiencing, a common node type shared between nodes 302, and/or any other relationship that enables system 300 to function as described herein. In an embodiment, edges 304 may be grouped or defined by one or more edge categories (not shown in FIG. 3). In addition, as described more fully herein, edges 304 and edge categories are extensible such that an application may add new edges 304 and/or edge categories to system 300 and/or nodes 302.

In an embodiment, a plurality of applications $306_1$-$306_N$ monitors and/or manages nodes 302 within system 300. Each application $306_1$-$306_N$ monitors and/or manages at least a subset 308 of nodes 302 within system 300 such that each application $306_1$-$306_N$ has or defines a view and/or a perspective for each node 302 within subset 308. Accordingly, an application boundary or scope 310 is defined by, or includes, subset 308 of nodes 302 within boundary 310. More specifically, each application $306_1$-$306_N$ may identify or define one or more edge categories and/or node types that application $306_1$-$306_N$ will manage and/or monitor, and subset 308 includes each node 302 that satisfies the edge categories and/or node types. The perspective includes the data, actions, and/or configuration settings for a node 302. In addition, application boundary 310 of one application $306_1$ may overlap an application boundary 310 of another application $306_2$ or applications $306_2$-$306_N$ such that subsets 308 of applications $306_1$-$306_N$ may overlap, or share common nodes 302. Accordingly, each application $306_1$-$306_N$ may have a different perspective of a node 302 common to other applications $306_1$-$306_N$ such that each application $306_1$-$306_N$ may include a different amount and/or type of data, actions, and/or configuration settings for node 302.

In an embodiment, applications $306_1$-$306_N$ may include, without limitation, vSphere, vCloud, View, Virtual Infrastructure (VI), VMware Update Manager (VUM) and/or Site Recovery Manager (SRM) brand software, which are available from VMware, Inc. Alternatively or additionally, applications $306_1$-$306_N$ may include one or more third party and/or user-defined applications.

In some embodiments, a node 302 that currently is the focus (or is in context) of the application $306_1$-$306_N$ being accessed is an anchor node 302. Nodes 302 that share one or more edges 304 with (i.e., are related to) anchor node 302 are related nodes 302.

Figure 4:
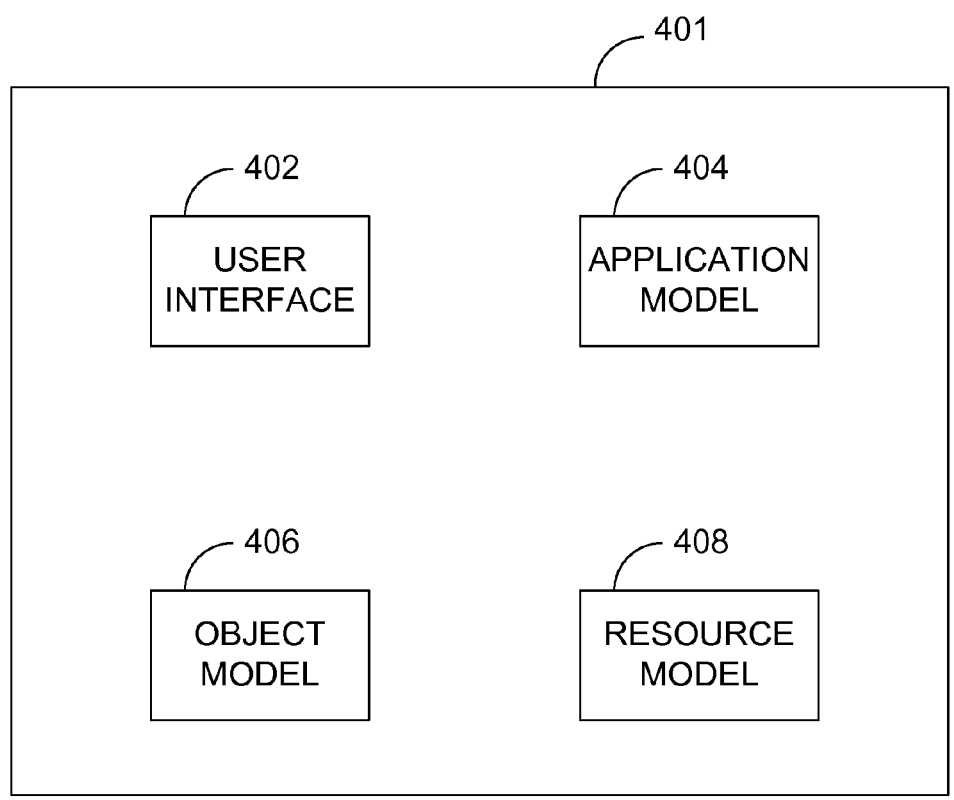
FIG. 4 is a block diagram of an exemplary extensible infrastructure that may be used with the network system shown in FIG. 3.
Figure 5:
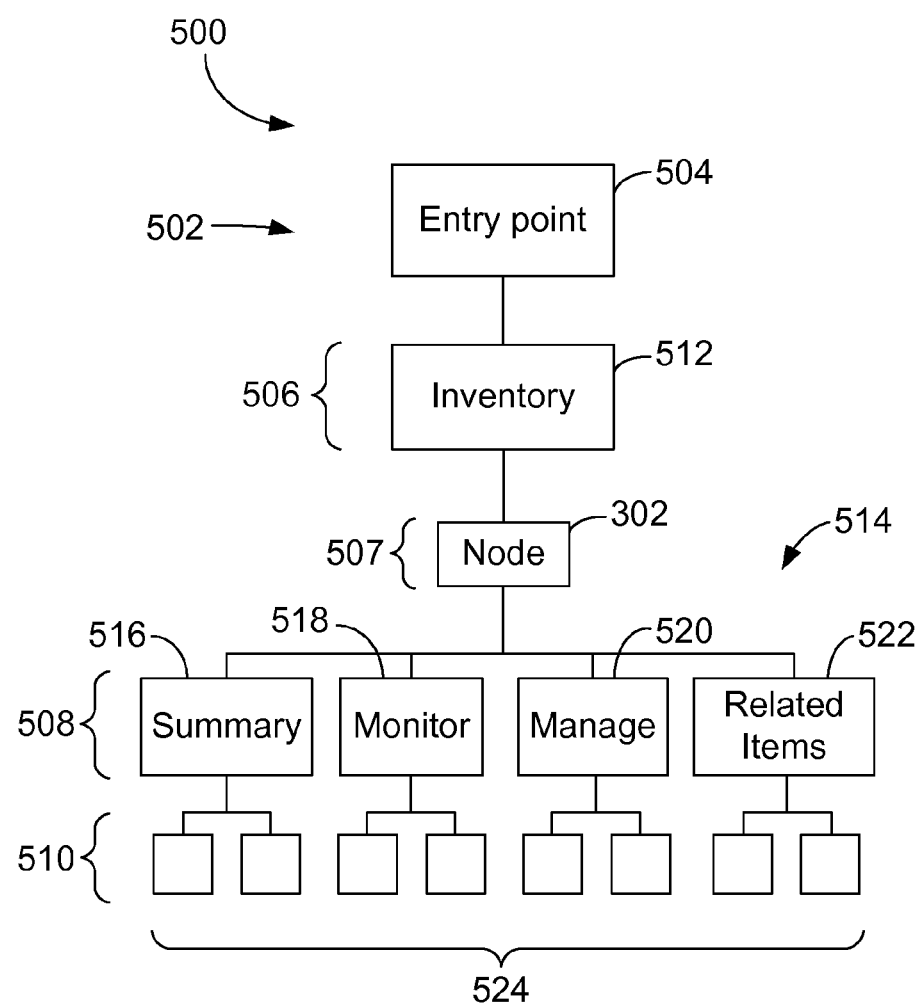
FIG. 5 is a block diagram of an exemplary extensible user interface hierarchy that may be used with the infrastructure shown in FIG. 4.

FIG. 4 is a block diagram of an exemplary extensible virtual machine application infrastructure 401 that may be used to monitor and/or manage system 300 (shown in FIG. 3). More specifically, applications $306_1$-$306_N$ (shown in FIG. 3) may "plug into," or integrate with, application infrastructure 401 using one or more extensions (not shown) to monitor and/or manage nodes 302 (shown in FIG. 3) of system 300. FIG. 5 is a block diagram of an exemplary extensible user interface hierarchy 500 that may be used with infrastructure 401. FIGS. 6-11 are exemplary screen captures of a user interface 402 including a plurality of views implemented by applications $306_1$-$306_N$ (shown in FIG. 3) using infrastructure 401.

In an embodiment, application infrastructure 401 and user interface 402 (and associated node information and views) are implemented and/or executed by one or more computing devices 100. For example, infrastructure 401 and user interface 402 are implemented by a plurality of computer-executable instructions and/or components stored within a memory, such as memory 104 or memory 250, and the instructions are executed by a processor, such as processor 102 or processor 245 (all shown in FIG. 2) to perform the functions described herein. In addition, user interface 402 is displayed to a user by presentation device 106 and input from a user is received by user input device 110 (both shown in FIG. 1).

Referring again to FIG. 4, in an embodiment, infrastructure 401 includes an application model 404, an object model 406, a resource model 408, and user interface 402. Each model 404, 406, and 408 and/or user interface 402 includes and/or defines templates, application programming interfaces (APIs), programming objects and components, user interfaces, and/or any other data and/or instructions that enables infrastructure 401 to function as described herein.

As described more fully herein, user interface 402 includes a plurality of views (not shown in FIG. 4) for managing and monitoring nodes 302. The views may be defined by, and/or provided by, application model 404, object model 406, and/or applications $306_1$-$306_N$.

Resource model 408 defines a plurality of resource node types, such as physical resource nodes (also known as "backing nodes or objects"), virtual resource nodes, virtual consumer nodes, and container nodes. A physical resource node provides a resource. For example, a disk or storage area network (SAN) provides storage resources. A virtual resource node provides a layer of abstraction on top of the physical resource. For example, resource pools abstract central processing units (CPUs) and memory, datastores abstract storage disks, and a VMware Distributed Switch (vDS) brand software abstracts physical network interface cards (NICs). The resource abstraction may provide capabilities that cannot be assigned to the physical resource directly, like load balancing across multiple physical resources. A virtual consumer node, such as a VM $235_1$-$235_N$, consumes a virtual resource, and container nodes organize or categorize other nodes.

Application model 404 defines an extensible hierarchy of views (shown in FIG. 5) that are exposed to applications $306_1$-$306_N$ for applications $306_1$-$306_N$ to access through one or more application extensions or plugins (also referred to as "view extensions" or "user interface extensions"). User interface 402 includes data from the objects and/or extensions of the hierarchy and presents the data, extensions, and/or views to a user. In addition, the views are extensible such that applications $306_1$-$306_N$ may incorporate additional data and/or actions into views. Application model 404 enables one or more applications $306_1$-$306_N$ to add data associated with applications $306_1$-$306_N$ to existing task and feature areas of application model views, instead of building out separate sub-applications within applications $306_1$-$306_N$. For example, if an application $306_1$ shows data about a node 302, that application $306_1$ may add the data to the existing view for that node 302. If an application $306_1$ must expose configuration settings for services provided by application $306_1$, such as electronic mail (email) or session management, that application $306_1$ may add controls to a general administration or settings portion of the view. If an application $306_1$ provides new nodes 302, data, use cases, and actions instead of augmenting an existing node 302, application $306_1$ is also enabled to provide one or more filters, views, and/or inventories that represent the perspective of application $306_1$ with respect to the subset 308 of nodes 302 (also known as an "inventory") within application boundary 310.

In an embodiment, application model 404 enables user interface 402 to centralize data, settings, and actions (hereinafter referred to as "node information") associated with nodes 302 such that users (through applications $306_1$-$306_N$) are able to configure settings for all applications $306_1$-$306_N$ in one place, view all issues on a managed node 302 from one view, and the like. In addition, application model 404 reduces duplication between different applications $306_1$-$306_N$. Instead of implementing multiple management, monitoring, or administration user interfaces or views, applications $306_1$-$306_N$ can add data to the existing user interface 402 (e.g., to one or more views) defined by application model 404.

Referring to FIG. 5, user interface 402 is arranged or implemented in one or more hierarchies 500 of views. In an embodiment, hierarchy 500 includes a plurality of levels 502, such as an entry point 504, an inventory level 506, a node level 507, a category extension level 508, and/or an application-specific extension level 510. Each level 502 of hierarchy 500 includes its own views of nodes 302, edge categories, and/or system 300. In addition, applications $306_1$-$306_N$ interface with, or extend, hierarchy 500 by inserting or installing an application extension (not shown) at one or more levels of hierarchy 500. Each application $306_1$-$306_N$ may include a separate hierarchy 500, and/or may be at least partially integrated with a hierarchy 500 of another application $306_1$-$306_N$.

In some embodiments, the term "extend" refers to augmenting or increasing a functionality of a component, device, or system. In addition, in some embodiments, the term "view" refers to a display, such as a window, tab, portlet, and/or any other display that enables an application $306_1$-$306_N$ or another program or component to present graphical data and/or text to a user. In an embodiment, views defined by application model 404 and/or object model 406 are displayed in a portion of user interface 402.

Each application $306_1$-$306_N$ may extend infrastructure 401 and/or user interface 402 to define an individual entry point 504 for accessing system 300 and/or initiating a workflow. Alternatively, an application $306_1$ may not include an entry point 504. For example, an application $306_1$ may only be configured to perform actions on nodes 302, and may not include views associated with nodes 302, or the application $306_1$ may only provide additional data within preexisting views provided by other applications $306_2$-$306_N$.

In an embodiment, inventory level 506 includes one or more inventories 512 that each identifies a plurality of nodes 302 related to an anchor node 302 by one or more edges 304. In addition, nodes 302 are grouped together by edge categories. Applications $306_1$-$306_N$ may extend inventory level 506 by defining one or more application-specific inventories 512 and/or defining one or more application-specific edges 304 and/or node types. Selecting one or more nodes 302 or edge categories causes user interface 402 to display a view associated with the node 302 or edge category.

Node level 507 includes a selected or focused node 302 (also known as an anchor node). When a node 302 is selected from inventory level 506 (or from another level 502), data and/or one or more views associated with node 302 are displayed by user interface 402.

Category extension level 508 includes one or more category views 514 defined by object model 406, such as a summary view 516, a monitor view 518, a manage view 520, a related items view 522, and/or any other view. In an embodiment, category views 514 are associated with, and display data associated with, a node 302 selected at node level 507. An application $306_1$ may extend category extension level 508 by inserting or installing an extension that adds data, configuration settings, and/or actions specific to application $306_1$ into one or more category views 514 of category extension level 508.

Application-specific extension level 510 includes one or more application-specific views 524 defined by object model 406 and/or applications $306_1$-$306_N$. More specifically, each application-specific view 524 of application-specific extension level 510 is associated with, and/or included within, a category view 514 of category extension level 508. An application $306_1$ may extend application-specific extension level 510 by inserting or installing an extension that adds data, configuration settings, and/or actions specific to application $306_1$ into one or more application-specific views 524 of application-specific extension level 510.

During operation, a user navigates through hierarchy 500 of views using a navigation panel (not shown in FIG. 5) of user interface 402. As the user navigates to category extension level 508 and/or application-specific extension level 510 of hierarchy 500, one or more associated category views 514 and/or application-specific views 524 are displayed to the user. In some embodiments, during navigation, data and views from multiple applications $306_1$-$306_N$ are displayed simultaneously in a data panel (shown in FIG. 6).

Figure 6:
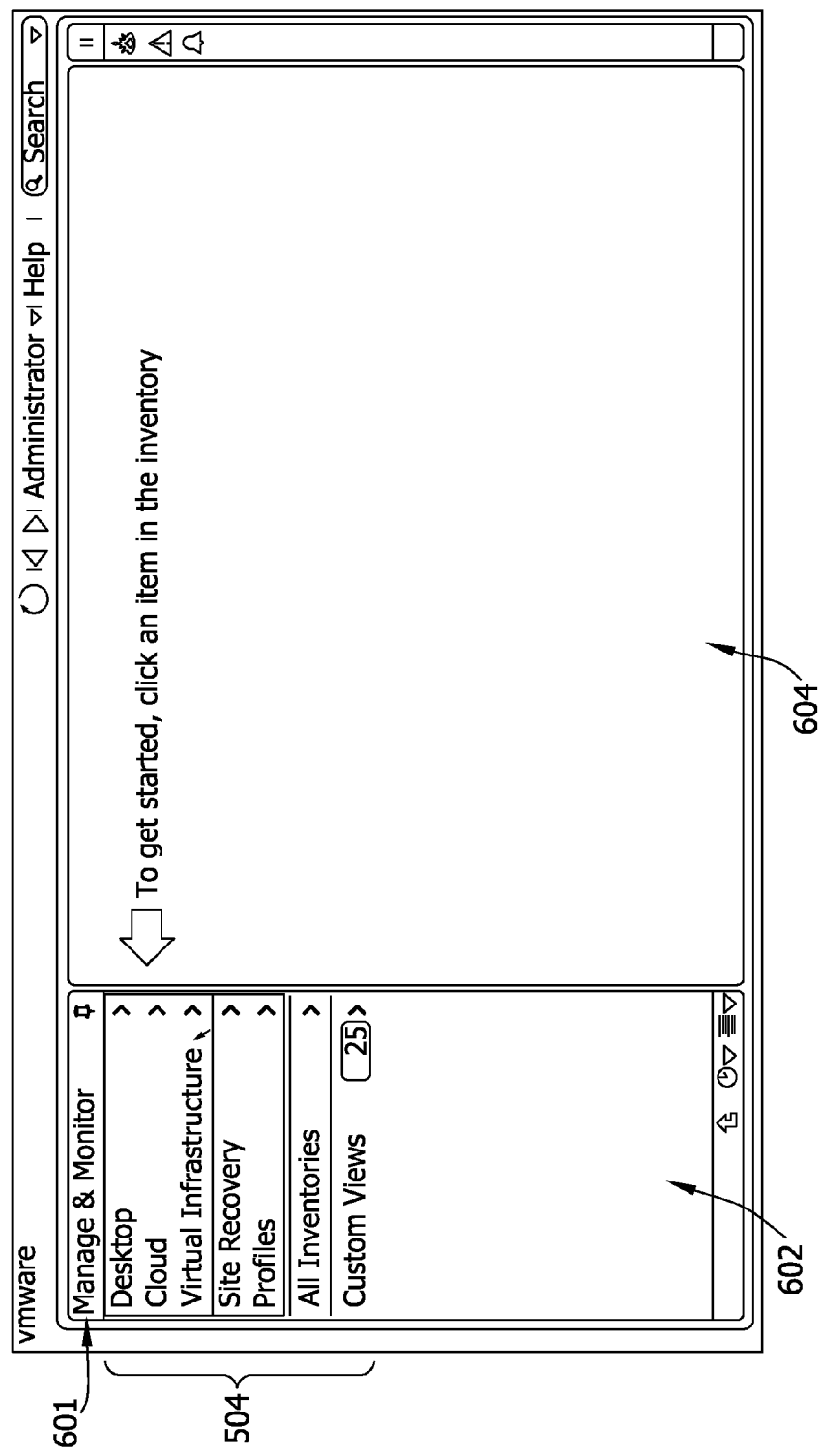
FIGS. 6-11 are exemplary screen captures of a user interface provided by the infrastructure shown in FIG. 4.

Referring to FIG. 6, application model 404 provides a manage and monitor interface 601 in which applications $306_1$-$306_N$ may plug into to add one or more application-specific views (not shown) for the management and/or monitoring of nodes 302 or application configuration settings. Manage and monitor interface 601 is positioned in a first, or navigation, panel 602 of user interface 402.

In an embodiment, application model 404 enables applications $306_1$-$306_N$ to define entry points 504 into system 300. Manage and monitor interface 601 includes one or more links to entry points 504 in navigation panel 602. Manage and monitor interface 601 enables applications $306_1$-$306_N$ to access and/or expose data, configuration settings, and/or actions (i.e., node information) for nodes 302, and enables such node information to be received from other applications $306_2$-$306_N$ while in the context of a currently-focused application $306_1$. The node information is displayed in a second, or data, panel 604 of user interface 402.

Figure 7:
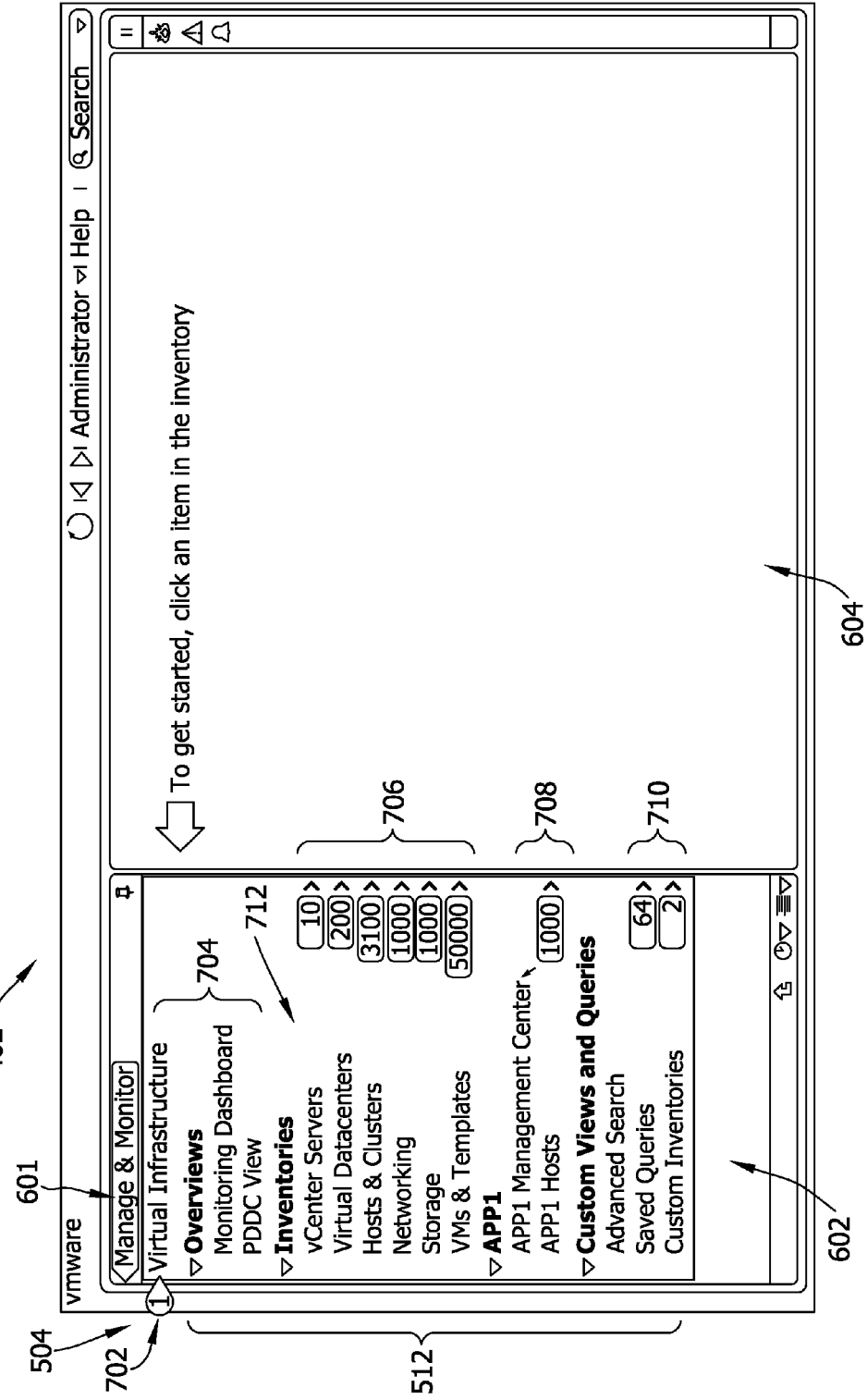

Referring to FIG. 7, a user may navigate hierarchy 500 of views for nodes 302 using navigation panel 602. More specifically, the user may select an entry point 504 to list or display one or more inventories 512 for the application $306_1$ selected by entry point 504. For example, as illustrated in FIG. 7, the user may select Virtual Infrastructure (VI) entry point 702 to focus on the VI application $306_8$ and to display inventories 512 associated with VI application $306_8$. Inventories 512 may include one or more groups of overviews or dashboards 704, node inventories 706, third-party application extensions 708, and/or custom views or queries 710. Node inventories 706 display inventories of nodes 302 listed by edge categories 712. More specifically, edge categories 712 are listed based on, and determined by, the node type. In addition, edge categories 712 of node inventory 706 may be selected to move to a lower level of hierarchy within navigation panel 602 to display and focus on a node 302 within node inventory 706.

Application model 404 may also define an administration or services view (not shown) that enables applications $306_1$-$306_N$ to plug into to offer configurations for services specific to applications $306_1$-$306_N$, such as database connections, polling rates, and the like. Additionally, application model 404 may define an application-specific view (not shown) that enables applications $306_1$-$306_N$ to add one or more views to offer application-specific user preferences and/or any other view that enables application model 404 to function as described herein.

Object model 406 defines a template for nodes 302 that are representative of system objects. More specifically, object model 406 categorizes node information such that each application $306_1$-$306_N$ may provide different aspects or perspectives of node information, and may provide new node types and/or edge categories 712, while maintaining a substantially uniform interface and display for the node information.

Figure 8:
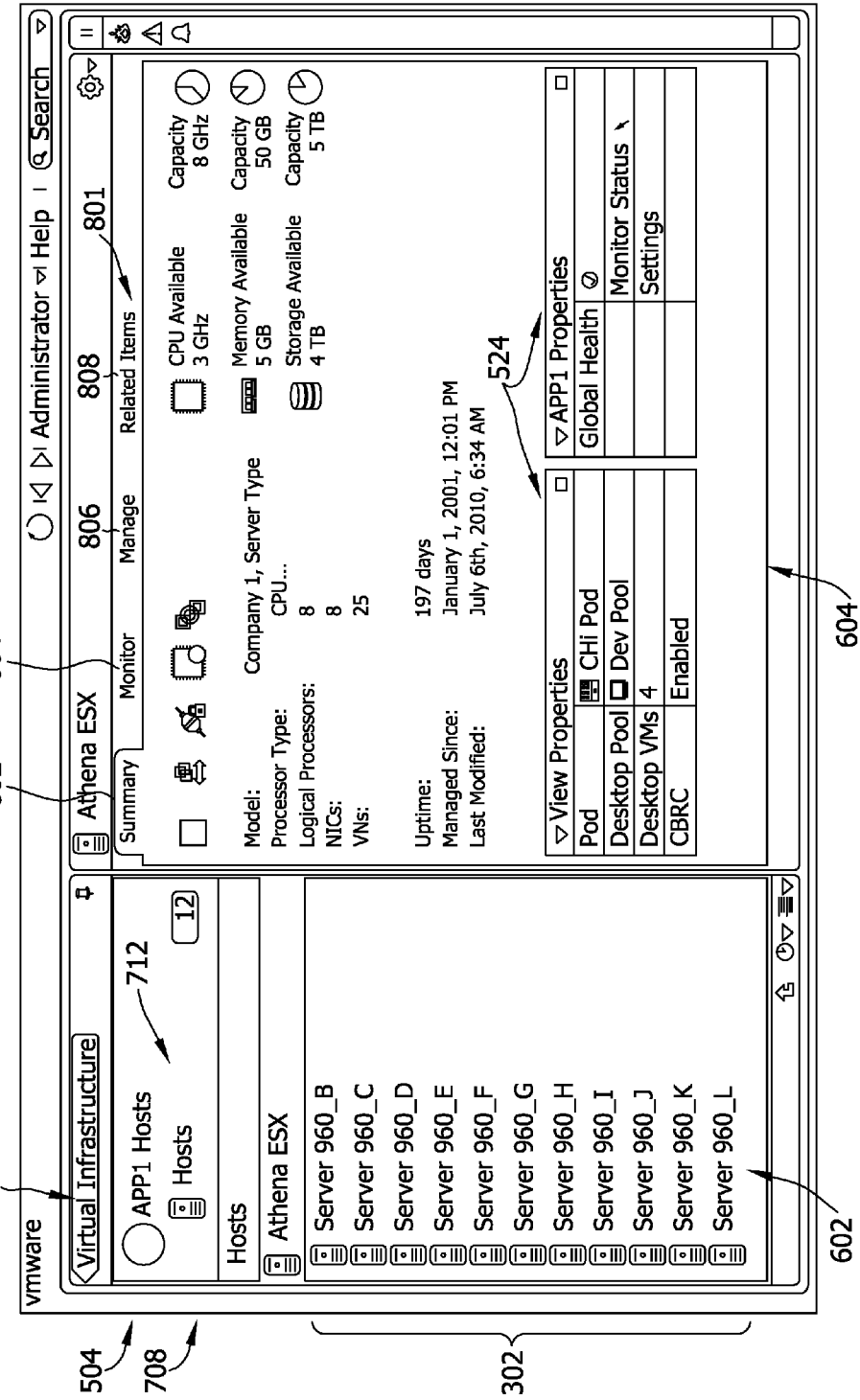

Referring to FIG. 8, a plurality of object model views 801 is defined by object model 406 for nodes 302, and are positioned and displayed by user interface 402 within data panel 604 at a category extension level 508. In an embodiment, object model views 801 include, or are displayed within, a plurality of windows, menus, or tabs, such as a getting started tab (not shown), a summary tab 802, a monitor tab 804, a manage tab 806, a related items tab 808, a legacy tab (not shown), and an action menu (not shown in FIG. 8) of user interface 402. In addition, applications $306_1$-$306_N$ may provide one or more application-specific views 524, such as tabs, menus, or portlets, as plugins or extensions to object model 406 at an application-specific extension level 510. In an embodiment, object model views 801 are positioned within data panel 604. In the embodiments shown in FIGS. 6-11, the getting started tab and the legacy tab are not displayed by user interface 402. Application-specific views 524 are also positioned within data panel 604 and below object model views 801.

The getting started tab provides an introduction to a selected node 302 (i.e., a node 302 selected within navigation panel 602), such as how node 302 fits into application $306_1$ and how node 302 is used. The tab also provides links to common tasks or actions associated with node 302.

Summary tab 802 includes summary view 516 and provides identification information for a selected node 302 and identifies any issues or events requiring attention. In an embodiment, the identification information includes high level data that enables a user to uniquely identify node 302. The high level data includes properties such as the name of node 302, user-readable globally unique identifier (GUID) such as a hostname or internet protocol (IP) address, and life-cycle properties of node 302, such as a creation date of node 302. Summary tab 802 also includes status information for the selected node 302, such as visual representations of resource utilization data for node 302.

In an embodiment, the issues identified by summary tab 802 include high priority identified misconfigurations of node 302 and/or notifications that require immediate attention of a user. In addition, other suitable data may be shown on summary tab 802, and may be disabled or removed by the user if the data is not desired.

Figure 9:
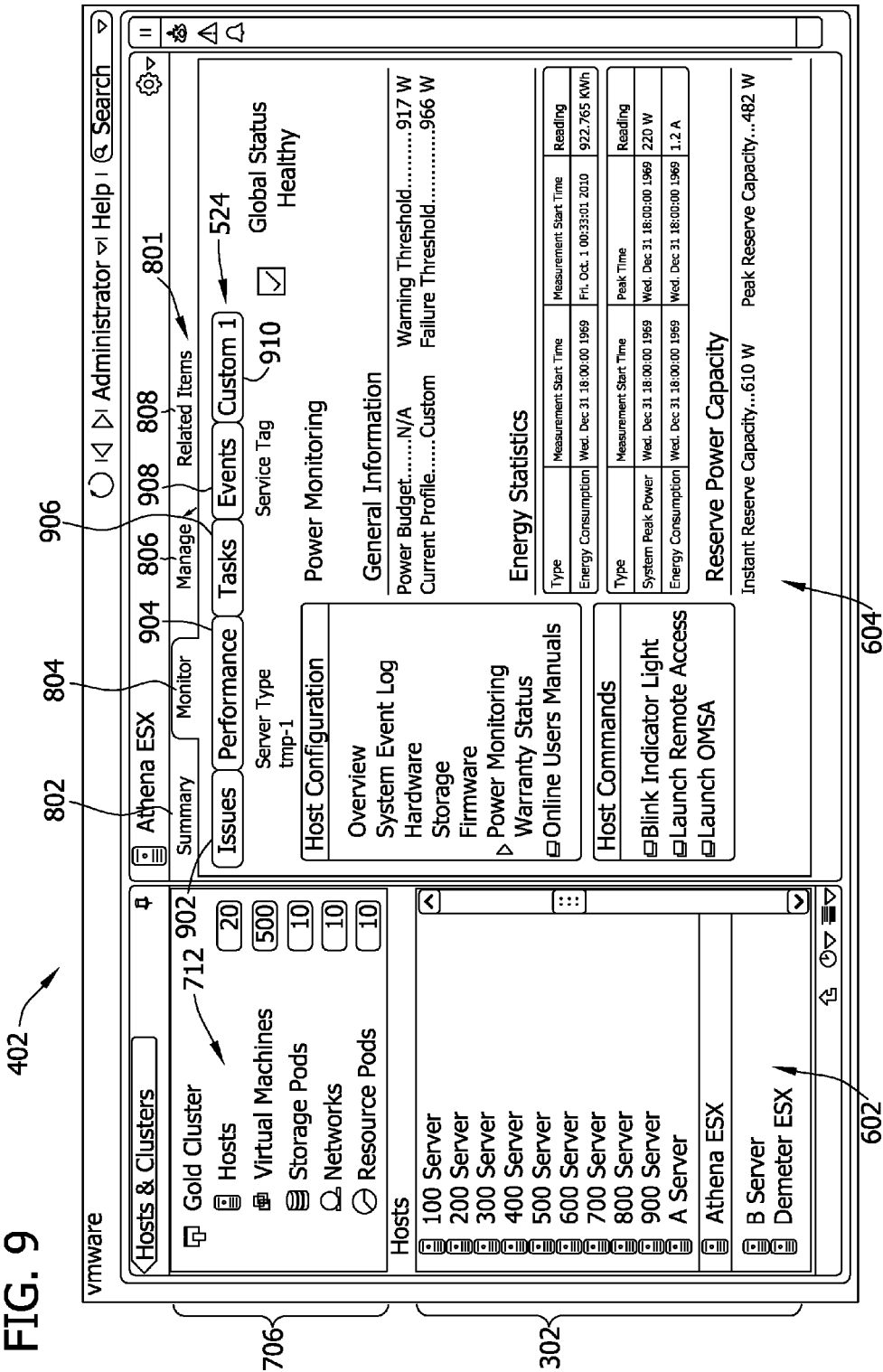

Referring to FIG. 9, monitor tab 804 includes monitor view 518 and displays node information for a selected or anchor node 302. In an embodiment, the node information includes runtime data describing a current operation of node 302, and/or historical data (not shown) for operation of node 302 in the past. For example, the runtime data may include a power state of a VM $235_1$-$235_N$, a distributed resource scheduler (DRS) recommendation for a cluster (not shown), a connection state of a host computing device 100, and/or performance and alarm data for node 302. The historical data may include one or more logs, tasks, and/or events.

In an embodiment, monitor tab 804 includes a plurality of application-specific views 524 defined by object model 406 and/or by one or more applications $306_1$-$306_N$, such as the focused application $306_1$. Monitor tab 804 may include application-specific views 524 that are displayed in, for example, an issues tab 902 for displaying issues affecting or associated with node 302. Monitor tab 804 may also include a performance tab 904 for displaying performance data related to a past activity of node 302, resource consumption data (i.e., how node 302 is using the resources allocated to node 302, if applicable), and/or profile performance data (e.g., how node 302 is performing relative to the profiles and health status set for node 302). In addition, monitor tab 804 may include a task tab 906 for displaying a long term record of tasks for node 302, and an event tab 908 for displaying a long term record of events on node 302 and/or one or more logs for node 302. An application, such as focused application $306_1$, may add or insert one or more application-specific tabs 910 to display application-specific data, configuration settings, and/or actions for node 302. If any data for monitor tab 804 is not relevant for a selected node 302, it may be removed or hidden.

It should be recognized that node information displayed within monitor tab 804 (e.g., displayed within application-specific views 524 and/or displayed within other views 801 defined by object model 406) may be within the context of one or more other applications $306_2$-$306_N$ in addition to, or instead of, the focused application $306_2$-$306_N$. More specifically, the node information displayed may be a part of the perspective of one or more other applications $306_2$-$306_N$ in addition to, or instead of the perspective of the focused application $306_1$. Accordingly, monitor tab 804 and/or other views 801 defined by object model 406 enables the focused application $306_1$ to receive and display node information for the selected node 302 from other applications $306_2$-$306_N$ without changing or leaving the focus of the currently focused application $306_1$.

Figure 10:
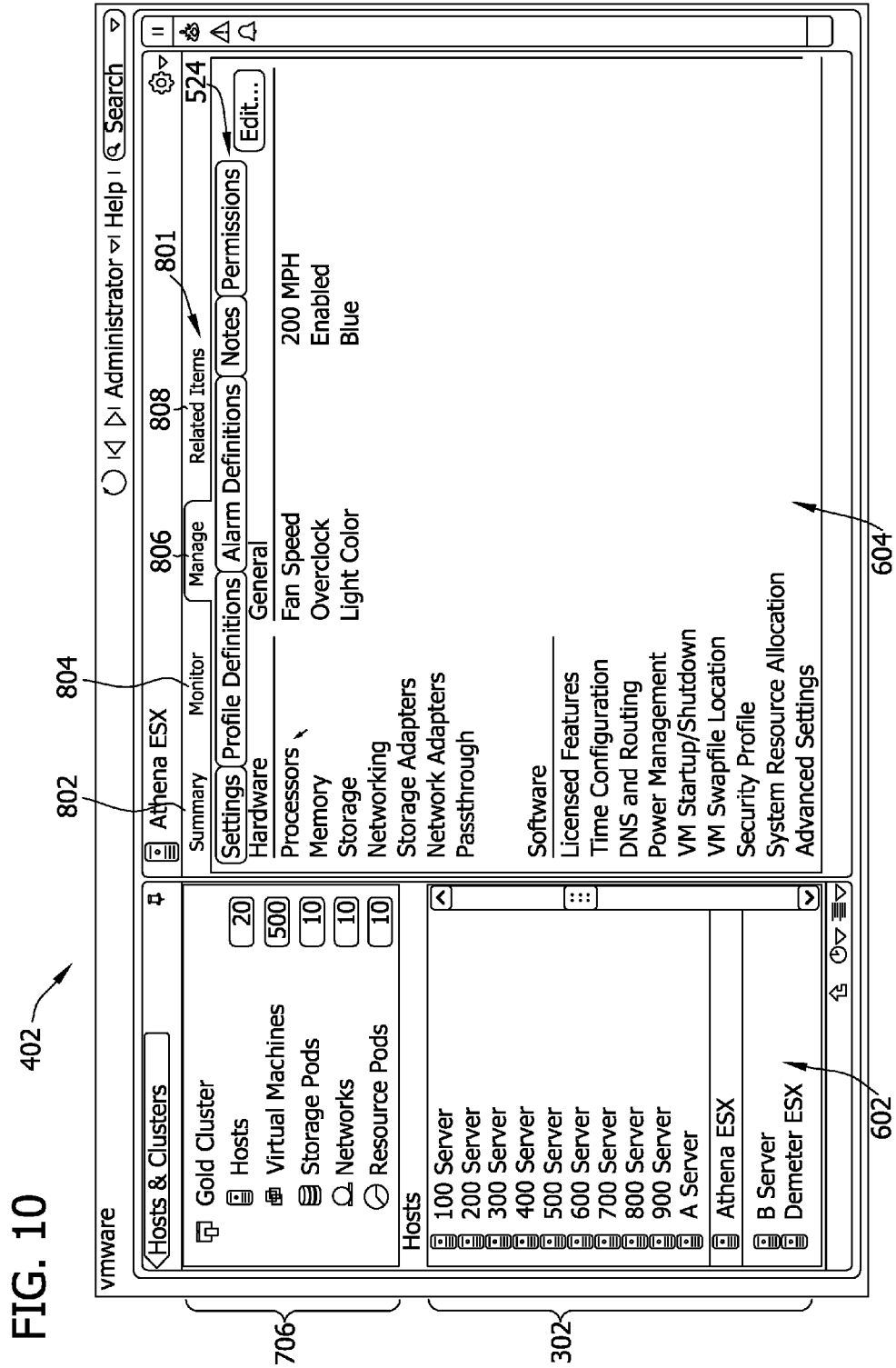

Referring to FIG. 10, manage tab 806 includes management properties of node 302 that affect how node 302 operates in system 300. The management properties are static properties that do not change unless the user or a policy changes them. In an embodiment, the management properties include resource allocation properties, node settings, profile definitions, alarm definitions, physical resource node properties (also known as "backing object properties"), tags, permission settings, and/or any other property or setting that enables manage tab 806 to function as described herein.

Resource allocation properties are configurable settings related to the resource types (if applicable) that node 302 exposes to related consumer nodes 302. Node settings include direct mutable properties of node 302, such as virtual hardware platform $240_1$-$240_N$ (shown in FIG. 2) of a VM $235_1$-$235_N$, and/or DRS settings of a cluster (not shown). Profile definitions identify any profile assigned to node 302 and, in some embodiment, enables the user to override the profile settings for node 302.

In addition, alarm definitions enable a user to define alarms for the selected node 302. Resource provision node properties display data for related nodes 302 that provide resources to the selected node 302. In an embodiment, tags include metadata that the user selects to identify or annotate the selected node 302, such as custom attributes and notes (e.g., descriptions of node 302). Permission settings identify which users and/or devices have authority to view or change the settings and/or properties of node 302. If one or more of the above properties or settings is not relevant to a given node type, it may be removed or hidden.

Figure 11:
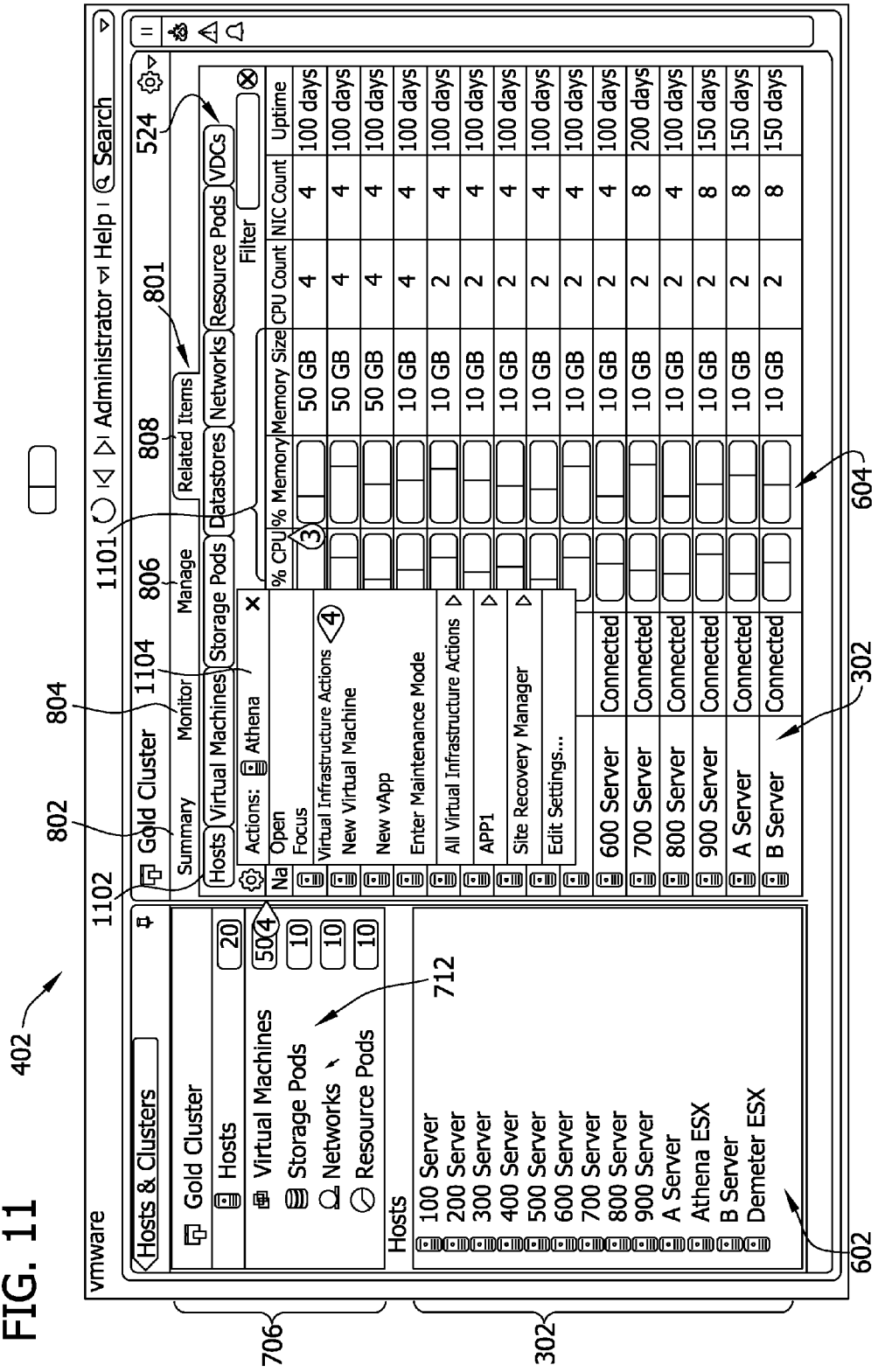

Referring to FIG. 11, related items tab 808 displays all or a portion of nodes 302 that related to the selected node 302 (i.e., all or a portion of nodes 302 sharing at least one edge 304 with selected node 302). More specifically, related items tab 808 identifies one or more edge categories 712, and displays all nodes 302 that share an edge 304 in edge categories 712 with the selected node 302. In addition, for each related node displayed in related items tab 808, one or more columns 1101 of node information is displayed. In some embodiments, columns 1101 of node information are selected based on the node type of the selected node 302 and/or the node type of the related nodes 302.

Columns 1101 may also be extended by application $306_1$ such that related items tab 808 includes one or more application-specific columns 1101 of node information. Such columns 1101 represent one or more edge categories 712 of selected node 302. For example, if the Hosts tab 1102 is selected as illustrated in FIG. 11, all nodes 302 related to selected node 302 by edge category 712 (e.g., all nodes 302 that have a node type set to host computing device 100) are displayed.

It should be recognized that related nodes 302 displayed within related items tab 808 may be within an application boundary 310 of one or more other applications $306_2$-$306_N$ in addition to, or instead of, the focused application $306_1$. Accordingly, related items tab 808 enables the focused application $306_1$ to receive and display node information for the selected node 302 from other applications $306_2$-$306_N$ (i.e., from the perspective of other applications $306_2$-$306_N$) without switching or changing the focus away from the currently focused application $306_1$.

In each view 801 defined by object model 406 and displayed by user interface 402, one or more actions to be performed on the selected node 302 may be displayed in an action menu 1104 or tab. When a node 302 is displayed in a view 801, the full set of actions available to be performed on the selected node 302 is available to the user in action menu 1104. More specifically, actions from each application $306_1$-$306_N$ perspective are available to the user for the selected node 302 within the context of the focused application $306_1$. However, the context of the focused application $306_1$ may define which actions are displayed to the user for selection.

As described herein with reference to FIGS. 6-11, each application $306_1$-$306_N$ is represented by one or more high-level inventories 512 in navigation panel 602. Inventories 512 are "jumping off points" or secondary entry points for workflows and views that display and manipulate nodes 302 of system 300 that applications $306_1$-$306_N$ share between each other.

A user or an administrator begins a workflow at an entry point 504 and/or inventory 512 for a selected (i.e., focused) application $306_1$. The user or administrator progresses through the workflow by navigating through hierarchy 500 to specific views 801 and nodes 302. The views 801 of a selected node 302 show the perspective of application $306_1$ for node 302 (e.g., node information), as well as the perspectives of all other applications $306_2$-$306_N$ that encompass node 302 within application boundaries 310. Because the node information for all applications $306_1$-$306_N$ is displayed and/or available in the details of node 302 within the views 801, the focused application $306_1$ is saved from duplicating common data of node 302 that is provided by other applications $306_2$-$306_N$.

After arriving at a particular view 801 or node 302, the administrator can conclude the workflow by manipulating node 302 (e.g., actions associated with node 302) for the originating application $306_1$, or for another application $306_2$-$306_N$ as needed. In one embodiment, node 302 is manipulated by changing data, at least one configuration setting, and/or at least one action for node 302, for example, that is displayed in data panel 604. By allowing an administrator to easily view and configure settings or perform actions for multiple applications $306_1$-$306_N$ without having to leave a single node view 801, user interface 402 effectively switches from one application $306_1$ to another application $306_2$-$306_N$ without having to change user interfaces 402 or applications $306_1$-$306_N$. This approach achieves a very high degree of integration that greatly improves administration efficiency.

Figure 12:
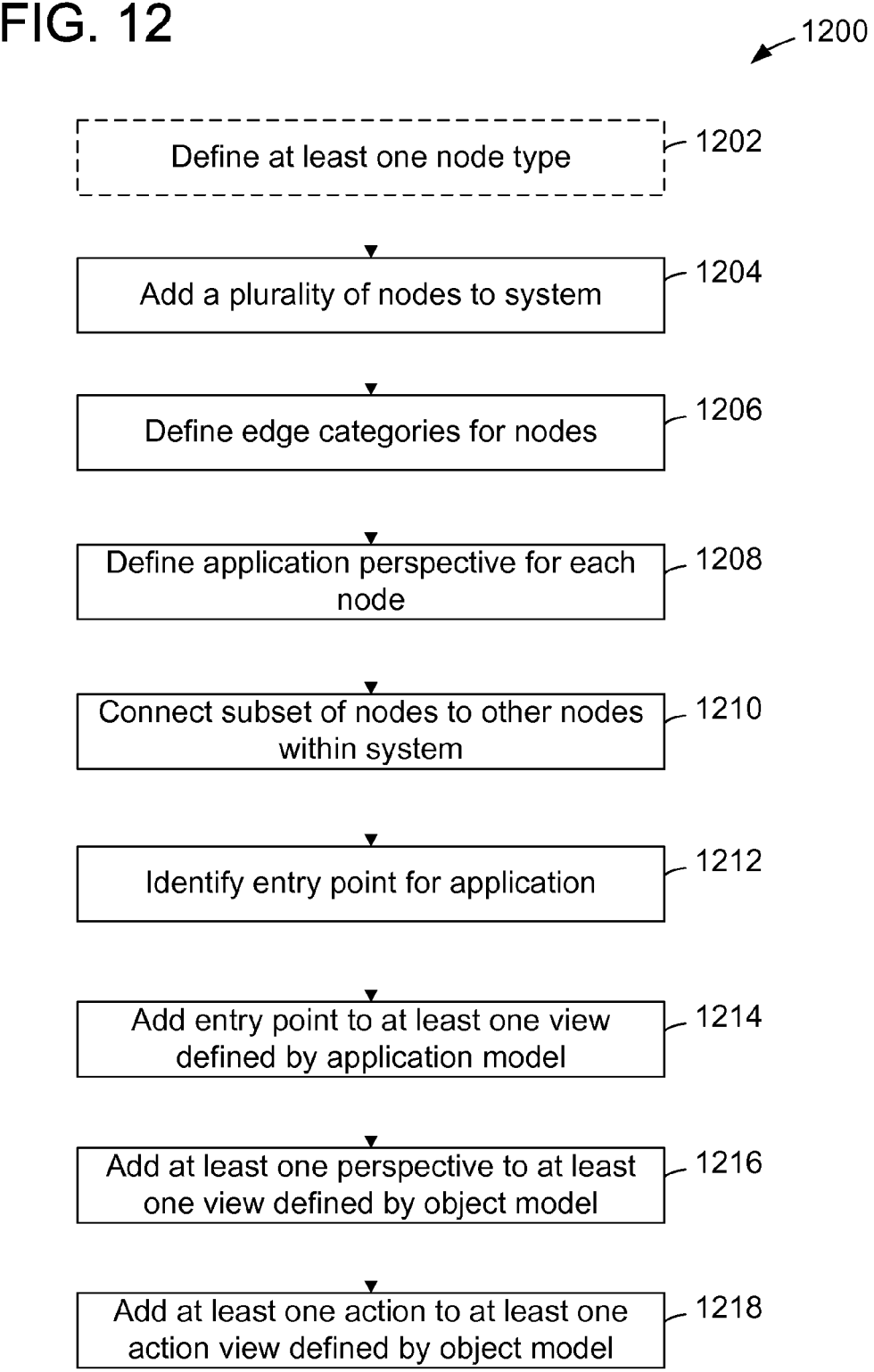
FIG. 12 is a flowchart of an exemplary method for installing an application within the infrastructure shown in FIG. 4.

FIG. 12 is a flowchart of an exemplary method 1200 for installing, or adding, an application $306_1$-$306_N$ (shown in FIG. 3) within infrastructure 401 (shown in FIG. 4). Method 1200 is executed by a computing device 100 (shown in FIG. 1). For example, a plurality of computer-executable instructions is embodied within a computer-readable medium, such as memory 104 or memory 250. The instructions, when executed by a processor, such as processor 102 or processor 245, cause the processor to execute the steps of method 1200 and/or to function as described herein.

In an embodiment, method 1200 optionally includes defining 1202 at least one new node type for use with a new application $306_1$ to be installed, or added, within infrastructure 401 (shown in FIG. 4). The new node type definition includes, for example, a list of all actions available to be performed on nodes 302 (shown in FIG. 3) of the new node type, a list of data and/or data types associated with nodes 302 of the new node type, and/or a list of configuration settings associated with nodes 302 of the new node type.

A plurality of nodes 302 associated with application $306_1$ (e.g., within a boundary 310 of application $306_1$) is added 1204 to system 300 (shown in FIG. 3) and/or infrastructure 401. The plurality of nodes 302 associated with application $306_1$ is also referred to as a subset 308 (shown in FIG. 3) of nodes 302 within application boundary 310. In addition, nodes 302 that are added 1204 to system 300 by application $306_1$ may be of the new node type and/or of node types pre-defined by application model 404, object model 406, and/or other applications $306_2$-$306_N$. The added nodes 302 are connected together by at least one edge 304 such that each node 302 is connected to at least one other node 302.

Edge categories 712 (shown in FIG. 7) are defined 1206 for each node 302 within subset 308 and are added to infrastructure 401. In an embodiment, application $306_1$ may define new edge categories 712, or use existing edge categories 712 that have been defined and/or used within system 300. In addition, an application perspective is defined 1208 for each node 302 of subset 308. In an embodiment, the perspective includes node information such as data, actions, and/or configuration settings for a node 302.

Subset 308 of nodes 302 is connected 1210 to other nodes 302 in system 300 by one or more edges 304 such that nodes 302 are integrated into system 300. An entry point 504 (shown in FIG. 5) for application $306_1$ is identified 1212 and is added 1214 to at least one view defined by application model 404 (and to hierarchy 500 (shown in FIG. 5)). In an embodiment, an application extension, such as entry point 504, is added 1214 to navigation panel 602 (shown in FIG. 6) at a selectable level of hierarchy 500 within views 801 defined by application model 404. The view 801 in which entry point 504 is added 1214 provides entry point 504 to a user along with at least one other entry point 504 from at least one other application $306_2$-$306_N$. Alternatively, application $306_1$ does not include an entry point 504, and steps 1212 and 1214 are omitted.

At least one perspective is added 1216 to at least one view 801 defined by object model 406 and displayed by user interface 402 for each added node 302 such that the added perspective is provided to the user by view 801 along with at least one other perspective from at least one other application $306_2$-$306_N$. In addition or alternatively, at least one action is added 1218 to at least one action menu 1104 (shown in FIG. 11) defined by object model 406 such that the added action is provided to the user by action menu 1104 along with at least one other action from at least one other application $306_2$-$306_N$. In some embodiments, the actions associated with the installed application $306_1$ nodes 302 and/or node types are added 1218 to each action menu 1104 defined by object model 406. Alternatively, no actions are added 1218 to a view 801 and/or an action menu 1104 such that only at least one perspective is added 1216 to at least one view 801.

In one embodiment, if application $306_1$ defines 1202 a new node type, application $306_1$ also defines the actions and/or data that take precedence when displaying the new type of node 302. In doing so, applications $306_1$-$306_N$ can specify which actions and/or data are appropriate or most relevant for a type of node 302 in the context of a focused node 302. For example, if a datastore node 302 includes a list of VMs $235_1$-$235_N$ inside of node 302, the actions and data (e.g., columns 1101 (shown in FIG. 11)) that are displayed for the list of VMs $235_1$-$235_N$ are relevant to storage. In addition, application $306_1$ creates views 801 (e.g., to display node information) that are extensible such that other applications $306_2$-$306_N$ may add data, configuration settings, and/or actions to the created views.

Figure 13:
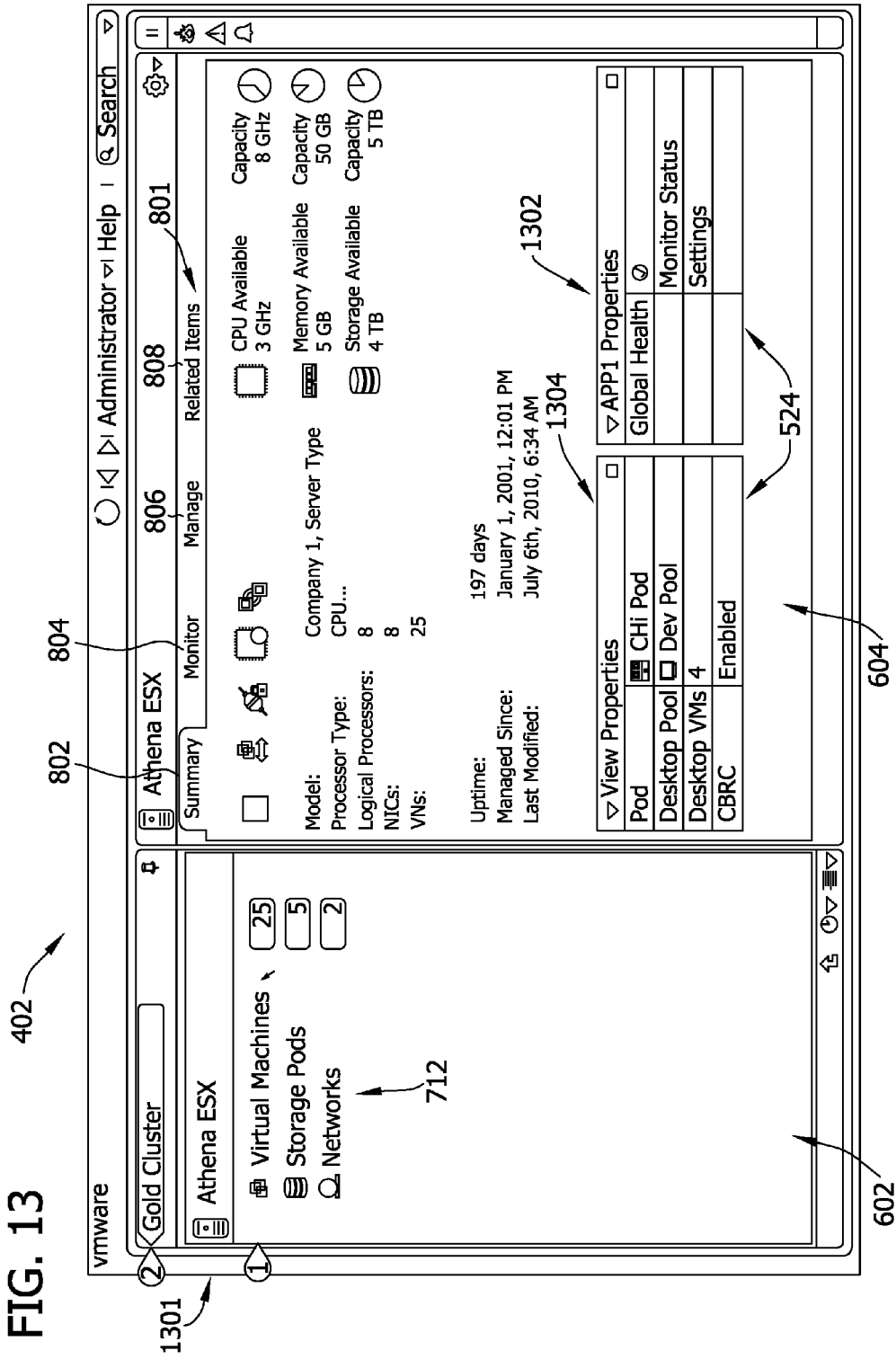
FIGS. 13-15 are additional screen captures of the user interface provided by the infrastructure shown in FIG. 4.
Figure 14:
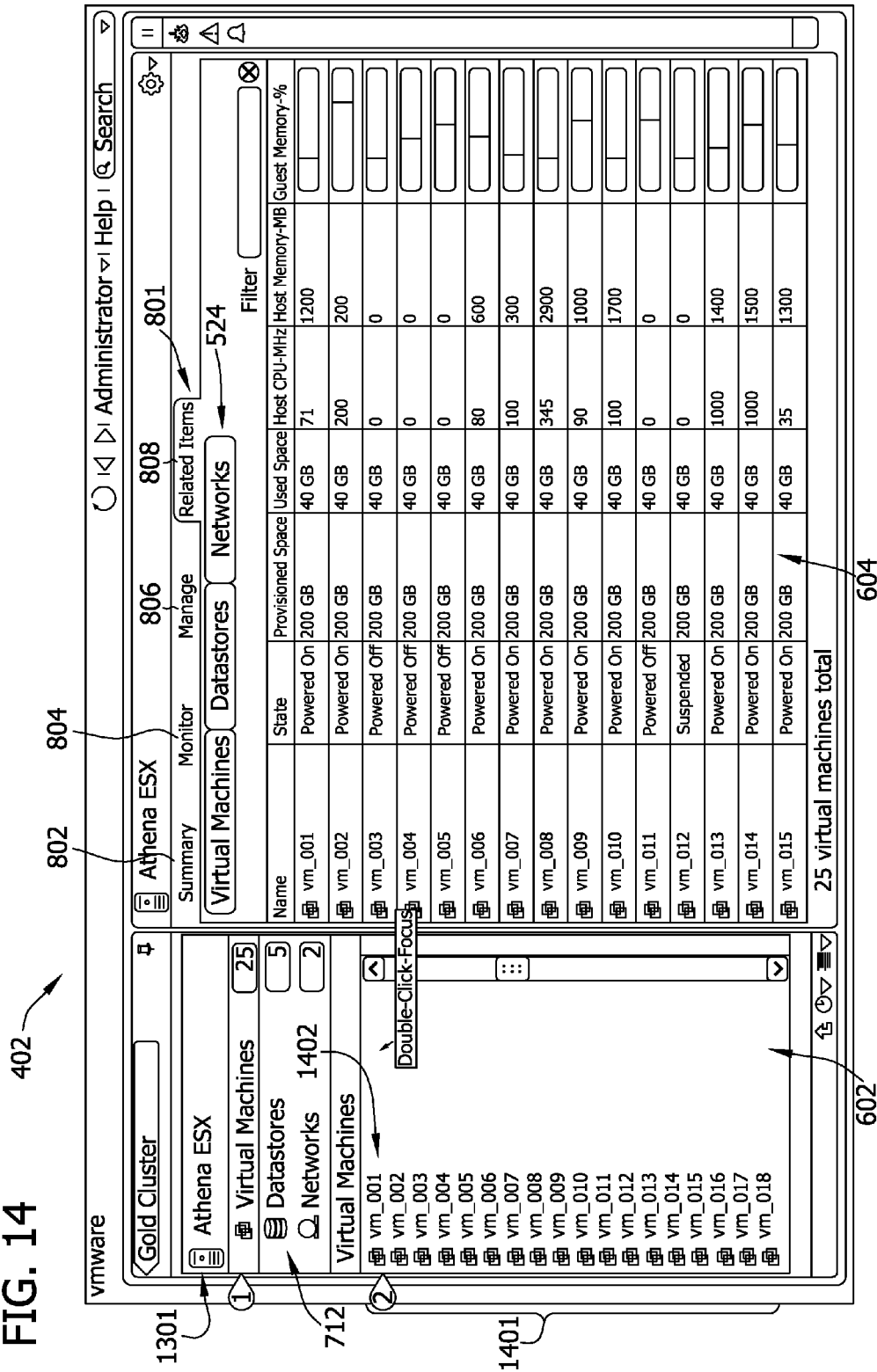
Figure 15:
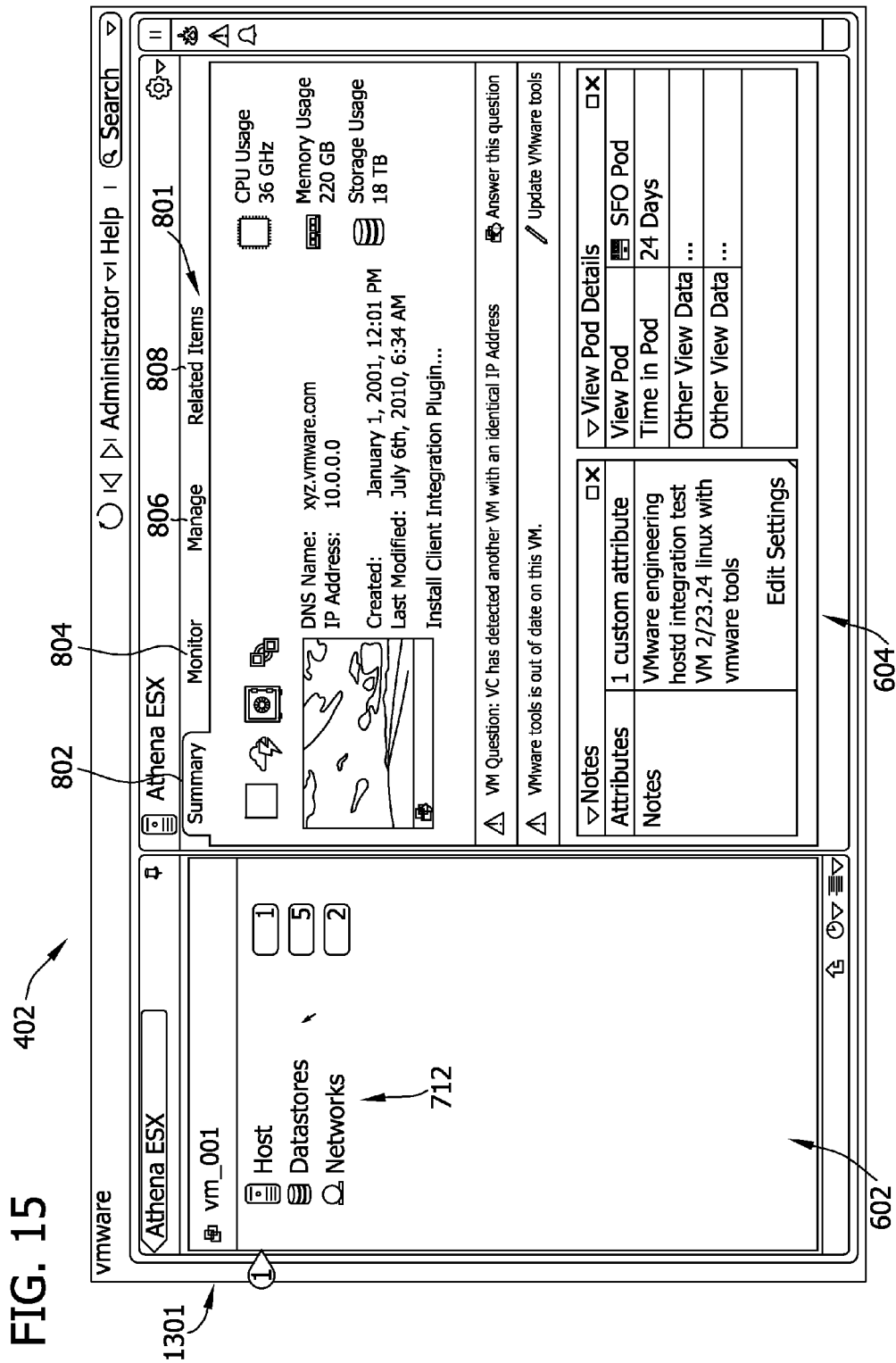

FIGS. 13-15 are additional exemplary screen captures of user interface 402 including a plurality of views implemented by applications $306_1$-$306_N$ (shown in FIG. 3) using infrastructure 401 (shown in FIG. 4).

Referring to FIG. 13, an anchor node 1301 is displayed within navigation panel 602, and edge categories 712 associated with anchor node 1301 are also displayed within navigation panel 602. More specifically, edge categories 712 are displayed and/or determined by the node type of anchor node 1301 such that different edge categories 712 are displayed for different node types.

Data associated with anchor node 1301 is displayed in data panel 604 when anchor node 1301 is selected within navigation panel 602. The data associated with anchor node 1301 is displayed in one or more views 801 as described above with reference to FIGS. 6-11. In addition, when anchor node 1301 is selected within navigation panel 602, a first application $306_1$ (shown in FIG. 3) displays a first set of data 1302 associated with anchor node 1301 within data panel 604 (e.g., within view 801) and a second application $306_2$ displays a second set of data 1304 associated with anchor node 1301 within data panel 604 (e.g., within view 801).

Referring to FIG. 14, when a user selects an edge category 712 for anchor node 1301, using user input device 110, a plurality of related nodes 1401 is identified and displayed within navigation panel 602. Related nodes 1401 are related to anchor node 1301 by an edge 304 (shown in FIG. 3) of the selected edge category 712. If the user selects a related node 1402 in navigation panel 602, data associated with the selected related node 1402 is displayed in data panel 604. In one embodiment, anchor node 1301 has a node type defined by a first application $306_1$ and selected related node 1402 has a node type defined by a second application $306_2$.

In addition, a new anchor node 1301 may be selected using options or actions provided in one or more views 801 of data panel 604. For example, the related node 1402 selected within navigation panel 602 may be selected as the new anchor node 1301 using options or actions provided in data panel 604.

Referring to FIG. 15, a user changes or switches a focus, or anchor node 1301, of navigation panel 602 to a related node 1402 (shown in FIG. 14) by inputting a command into navigation panel 602 or data panel 604. An edge category 712 of anchor node 1301 and an edge category of related node 1402 may be identified. In one embodiment, at least one edge category 712 of anchor node 1301 is different than edge category 712 of related node 1402. For example, as illustrated in FIG. 14, anchor node 1301 includes an edge category 712 of "virtual machines," and as illustrated in FIG. 15, the related node 1402 (i.e., the new anchor node 1301) includes an edge category 712 of "datastores" and/or may include any other edge category 712.

In an embodiment, navigation panel 602 is animated when switching the focus of navigation panel 602 from anchor node 1301 to related node 1402. More specifically, the animation includes causing navigation panel 602 to slide or be displaced to a side such that a representation of related node 1402 and edge category 712 associated with related node 1402 slide in to replace a representation of anchor node 1301 and edge category 712 associated with anchor node 1301. Anchor node 1301 and edge category 712 associated with anchor node 1301 slide out and are not displayed by navigation panel 602. Data associated with the new anchor node 1301 is displayed within data panel 604 when the new anchor node 1301 is selected by the user.

Figure 16:
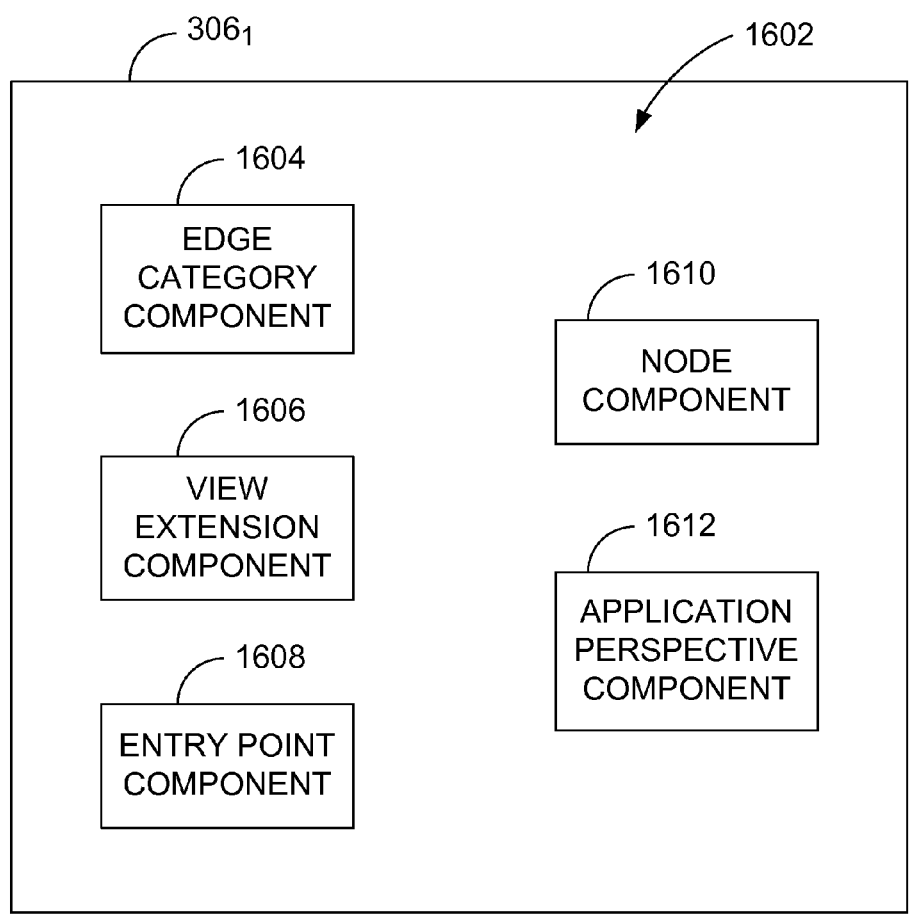
FIG. 16 is a block diagram of an exemplary application including a plurality of computer-executable components.

FIG. 16 is a block diagram of an application $306_1$ including a plurality of computer-executable components 1602. It should be recognized that other applications $306_2$-$306_N$ (shown in FIG. 3) include similar components 1602 that function as described herein.

In an embodiment, application $306_1$ may implement extensions described herein using components # to add to, or extend, user interface 402 at one or more levels of hierarchy 500 (shown in FIG. 5). Components 1602 may include an edge category component 1604 for adding an edge category 712 to infrastructure 401 and an application or view extension component 1606 for adding a view extension to user interface 402 (e.g., for adding application-specific views 524 to data panel 604). Components 1602 may also include an entry point component 1608 for adding entry points 504 to infrastructure 401 and/or system 300, and a node component 1610 for adding node types and/or nodes 302 to infrastructure 401 and/or system 300 and for connecting nodes 302 together. An application perspective component 1612 may also be included within applications $306_1$-$306_N$ for adding perspectives for each added node 302 and/or for pre-existing nodes 302.

As described herein, system 300 includes a plurality of applications $306_1$-$306_N$. Each application $306_1$-$306_N$ defines at least one edge category 712 and provides at least one view extension to extend, or add to, the functionality of system 300 and/or infrastructure 401. System 300 also includes a plurality of nodes 302 that each has a node type. In one embodiment, application $306_1$-$306_N$ defines the node type for each node 302 within a boundary 310 of application $306_1$-$306_N$. Each node 302 is connected to at least one other node 302 by an edge 304 in an edge category 712 associated with the type of node 302. In addition, system 300 includes a virtual machine infrastructure 401 including a user interface 402 for displaying data from the view extension of each application $306_1$-$306_N$.

User interface 402 is accessed by a user to navigate, in a tabular format (see, e.g., FIGS. 6-11), a graph formed by the plurality of nodes 302 (e.g., system 300) connected by edges 302. In some embodiments, user interface 402 simultaneously displays data from view extensions of two or more applications $306_1$-$306_N$. The data displayed is associated with an anchor node 1301 (i.e., a node 302 that is the focus of navigation panel 602 and/or user interface 402).

In the embodiments described herein, user interface 402 includes an entry point level including at least one extension (such an entry point 504) added by an application $306_1$. Data of the extension added at the entry point level by application $306_1$ is displayed in presentation device 106 to a user when user interface 402 is initially accessed by the user. User interface 402 also includes an inventory level 506 having at least one extension added by application $306_1$. Data of the extension added at inventory level 506 by application $306_1$ is displayed to the user when the user selects an extension at the entry point level corresponding to the extension at inventory level 506.

In addition, user interface 402 includes a category extension level 508 having at least one extension added by application $306_1$. Data of an extension added at category extension level 508 by application $306_1$ is displayed to the user when the user focuses user interface 402 (e.g., navigation panel 602) on a node 302 displayed by an extension added at inventory level 506. Category extension level 508 includes a plurality of tabs or views 801 under which an extension added by application $306_1$ displays data of the extension. In an embodiment, user interface 402 includes an application-specific extension level 510 having at least one extension added by application $306_1$. Data of an application-specific extension is displayed to the user when the user focuses user interface 402 on a node 302 having data of the application-specific extension associated with node 302.

In an embodiment, each level 502 of user interface 402 may be implemented by, or embodied within, an associated computer-readable component. Each computer-readable component is executed by a processor to perform the functions described herein.

Exemplary Operating Environment

The extensible infrastructure as described herein may be performed by a computer or computing device. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data on tangible, physical media. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed:

1. A system comprising:
one or more processors configured to execute:
a plurality of applications, each application:
defining at least one edge category for at least one of a plurality of nodes, each node connected to at least one other node of the plurality of nodes by an edge in an edge category associated with a type of the node; and
providing at least one plugin, each plugin augmenting user interface functionality by adding at least one corresponding view for managing and/or monitoring one or more of the nodes, and
a user interface of a virtual machine infrastructure, the user interface displaying the at least one corresponding view from each of the at least one plugin of each of the plurality of applications simultaneously, wherein each of the plurality of nodes is a system object.

2. The system of claim 1, wherein the user interface navigates a graph formed by the plurality of nodes connected by edges in a tabular format.

3. The system of claim 1, wherein display data from the at least one of the views is associated with an anchor node and the anchor node is the focus of a navigation panel of the user interface.

4. The system of claim 1, wherein an application of the plurality of applications defines a type of at least one node.

5. The system of claim 1, wherein adding an application extends the functionality of the virtual machine infrastructure.

6. A method of adding an application to a virtual machine infrastructure, the method comprising:
adding an edge category to the virtual machine infrastructure, wherein the edge category defines a set of nodes, wherein each node in the set of nodes is a system object and is connected to at least one other node by an edge in the edge category, and wherein the virtual machine infrastructure includes an application model and a user interface at least partially defined by the application model; and
adding a first plugin, which augments user interface functionality by adding at least a first view for managing and/or monitoring one or more of the nodes, to the user interface of the virtual machine infrastructure using the application model, wherein the user interface simultaneously displays the first view from the first plugin together with a second view from a second plugin provided by another application, the user interface displaying data shared by the first and second views.

7. The method of claim 6, further comprising adding a node type to the virtual machine infrastructure.

8. The method of claim 6, further comprising adding a node to the virtual machine infrastructure.

9. The method of claim 6, wherein the user interface of the virtual machine infrastructure simultaneously displays data from at least two applications added to the virtual machine infrastructure.

10. The method of claim 6, wherein adding an application extends the functionality of the virtual machine infrastructure.

11. The method of claim 6, further comprising adding a plurality of nodes to the virtual machine infrastructure and connecting each node of the plurality of nodes to at least one other node.

12. The method of claim 6, further comprising adding an entry point to the user interface of the virtual machine infrastructure.

13. The method of claim 6, further comprising:
adding a plurality of nodes to the virtual machine infrastructure; and
adding an application perspective for each of the plurality of added nodes.

14. A computer readable storage media having computer executable instructions, the computer executable instructions comprising:
an application comprising components that provide functionality to a virtual machine infrastructure, the virtual machine infrastructure comprising an application model and a user interface at least partially defined by the application model, the application further comprising:
an edge category component for adding an edge category to the virtual machine infrastructure, wherein the edge category defines a set of nodes, and wherein each node in the set of nodes represents a system object and is connected to at least one other node by an edge in the edge category; and
a view extension component for adding a first plugin, which augments user interface functionality by adding at least a first view for managing and/or monitoring one or more of the nodes, to the user interface of the virtual machine infrastructure, the user interface displaying the first view from the first plugin simultaneously with a second view from a second plugin provided by another application, the user interface displaying data shared by the first and second views.

15. The computer readable storage media of claim 14, the application further comprising a node component for adding a node type to the virtual machine infrastructure.

16. The computer readable storage media of claim 14, wherein the user interface of the virtual machine infrastructure simultaneously displays data from at least two applications added to the virtual machine infrastructure.

17. The computer readable storage media of claim 14, wherein the application extends the functionality of the virtual machine infrastructure.

18. The computer readable storage media of claim 14, the application further comprising a node component for adding a plurality of nodes to the virtual machine infrastructure and connecting each node of the plurality of nodes to at least one other node.

19. The computer readable storage media of claim 14, the application further comprising an entry point component for adding an entry point to the user interface of the virtual machine infrastructure.

20. The computer readable storage media of claim 14, wherein the application further comprises:
a node component for adding a plurality of nodes to the virtual machine infrastructure; and
an application perspective component for adding an application perspective for each of the plurality of added nodes.

21. The system of claim 1, wherein the system object is one of the following: a computing device, a system resource, or a network switch.

* * * * *